(12) United States Patent
Xie et al.

(10) Patent No.: US 10,983,629 B2
(45) Date of Patent: *Apr. 20, 2021

(54) TOUCH PANELS AND FABRICATION METHODS THEREOF

(71) Applicant: TPK Touch Solutions (Xiamen) Inc., Xiamen (CN)

(72) Inventors: Yanjun Xie, Wuhan (CN); Yau-Chen Jiang, Hsinchu County (TW); Bixin Guan, Xiamen (CN); Zhuxiu Lin, Zhangpu (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,494

(22) Filed: Jun. 12, 2019

(65) Prior Publication Data

US 2019/0294293 A1 Sep. 26, 2019

Related U.S. Application Data

(62) Division of application No. 15/073,670, filed on Mar. 18, 2016, now Pat. No. 10,359,877.

(30) Foreign Application Priority Data

Mar. 18, 2015 (CN) .......................... 201510116707.3

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04103* (2013.01); *G06F 2203/04107* (2013.01)

(58) Field of Classification Search
None
See application file for complete search history.

(56) References Cited

U.S. PATENT DOCUMENTS

| 2011/0227858 | A1* | 9/2011 | An | G06F 3/044 |
| | | | | 345/174 |
| 2014/0225859 | A1* | 8/2014 | Badaye | G06F 3/044 |
| | | | | 345/174 |
| 2015/0169105 | A1* | 6/2015 | Tung | G06F 3/044 |
| | | | | 345/174 |
| 2015/0362960 | A1* | 12/2015 | Chang | G06F 1/1692 |
| | | | | 345/173 |

* cited by examiner

*Primary Examiner* — Charles D Garber
*Assistant Examiner* — Xiaoming Liu
(74) *Attorney, Agent, or Firm* — Idea Intellectual Limited; Margaret A. Burke; Sam T. Yip

(57) ABSTRACT

A touch panel and a fabrication method thereof are provided. The touch panel includes a first axial electrode containing a plurality of first conductive units. Two adjacent first conductive units are separated and electrically connected by a first jumper and one first conductive unit has an extending part. The touch panel also includes a second axial electrode containing a plurality of second conductive units. Two adjacent second conductive units are connected through a connection part at the first jumper. Two adjacent second conductive units are separated and electrically connected by a second jumper at the extending part of the first conductive unit. The first axial electrode is insulated from and intersects the second axial electrode. The first and second jumpers have different axial directions.

6 Claims, 10 Drawing Sheets

TOUCH PANELS AND FABRICATION METHODS THEREOF

The current application is a divisional application of U.S. application Ser. No. 15/073,670, filed on Mar. 18, 2016, which claims a foreign priority to the Chinese Patent Application No. 201510116707.3, filed on Mar. 18, 2015.

BACKGROUND OF THE INVENTION

Field of the Invention

The disclosure relates to touch panel technology, and in particular to the orientation of jumpers for sensing electrodes of touch panels and methods of fabricating the touch panels.

Description of the Related Art

Recently, touch panel techniques have been developed to be a main input method, and they have been popularly applied in various electronic products, such as mobile phones, personal digital assistants (PDA), and handheld personal computers. Touch sensors of a touch panel include a plurality of sensing electrodes arranged to form a plurality of rows and a plurality of sensing electrodes arranged to form a plurality of columns. In addition, insulating blocks are disposed at the intersections of the sensing electrodes arranged in rows and the sensing electrodes arranged in columns to avoid a short circuit occurring between the sensing electrodes in rows and the sensing electrodes in columns.

Generally, in the touch panels, the sensing electrodes arranged in columns are composed of a plurality of conductive units which are connected with each other. The sensing electrodes arranged in rows are composed of a plurality of conductive units which are separated from each other. The separated conductive units are electrically connected to each other by a jumper crossing over the insulating block. In known touch panels, all the jumpers are disposed in the same direction. For example, while the jumpers are used for electrically connecting the conductive units of the sensing electrodes that are arranged in rows, all the jumpers in the touch panel are disposed along the direction of the rows.

However, in a non-viewable are of the known touch panels, a ground wire is disposed between a touch sensing signal transmission line and a sensing electrode, and all the jumpers are disposed in a general direction as per the above description. In order to prevent the ground wire from electrically connecting to the touch sensing signal transmission line or the sensing electrode, more processing steps are needed to complete the touch panel. As a result, the processing steps of forming the touch panel are complicated and the cost of fabricating the touch panel cannot be reduced.

BRIEF SUMMARY OF THE INVENTION

In order to overcome the above problems of the known touch panel technology, the disclosure provides touch panels and fabrication methods thereof. Using the orientation of jumpers for sensing electrodes to decrease the processing steps of forming the touch panels. The cost of fabricating the touch panels is thereby reduced.

According to some embodiments of the disclosure, a touch panel is provided. The touch panel comprises a first axial electrode including a plurality of first conductive units, wherein two adjacent first conductive units are separated from each other and one of the first conductive units has an extending part. The touch panel also comprises a first jumper electrically connecting the two adjacent and separated first conductive units with each other. The touch panel further comprises a second axial electrode including a plurality of second conductive units, wherein two adjacent second conductive units are connected with each other through a connection part at the location of the first jumper, and other two adjacent second conductive units are separated from each other at the location of the extending part of the first conductive unit. The second axial electrode is insulated from and intersects with the first axial electrode. In addition, the touch panel comprises a second jumper disposed at the location of the extending part of the first conductive unit for electrically connecting the two adjacent and separated second conductive units at the extending part with each other. An axial direction of the second jumper is different from the axial direction of the first jumper.

According to some embodiments of the disclosure, a method of fabricating a touch panel is provided. The method comprises forming a first jumper and a second jumper over a substrate, wherein an axial direction of the second jumper is different from the axial direction of the first jumper. The method also comprises forming an insulating layer including a first insulating portion located in the first jumper and a second insulating portion located in the second jumper, wherein the second insulating portion has a first opening and a second opening to expose a portion of the second jumper. The method further comprises forming a first axial electrode and a second axial electrode on the substrate. The first axial electrode includes a plurality of first conductive units, wherein two adjacent first conductive units are separated from each other and electrically connected with each other through the first jumper, and one of the first conductive units has an extending part. The second axial electrode includes a plurality of second conductive units, wherein two adjacent second conductive units are connected with each other through a connection part at the location of the first jumper, and other two adjacent second conductive units are separated from each other at the location of the extending part of the first conductive unit. The two adjacent and separated second conductive units are electrically connected to the second jumper through the first opening and the second opening. The second axial electrode is insulated from and intersects with the first axial electrode.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The following description is of the contemplated mode of carrying out the disclosure. This description is made for the purpose of illustrating the general principles of the disclosure and should not be taken in a limiting sense.

In the descriptions that follow, the orientations of "on", "over", "above", "under" and "below" are used for representing the relationship between the relative positions of each element in the touch panels, and are not used to limit the disclosure.

In the accompanying drawings, in order to clearly illustrate the characteristics of embodiments of the disclosure, each element in the touch panels may not be drawn to scale. Moreover, the embodiments of the touch panels and the methods of forming the same are described in an orientation in which the substrate is disposed at the bottom. However, in at least some touch panel applications, the touch panels are provided for users in an orientation in which the substrate is disposed at the top of touch panels.

Figure 1A:
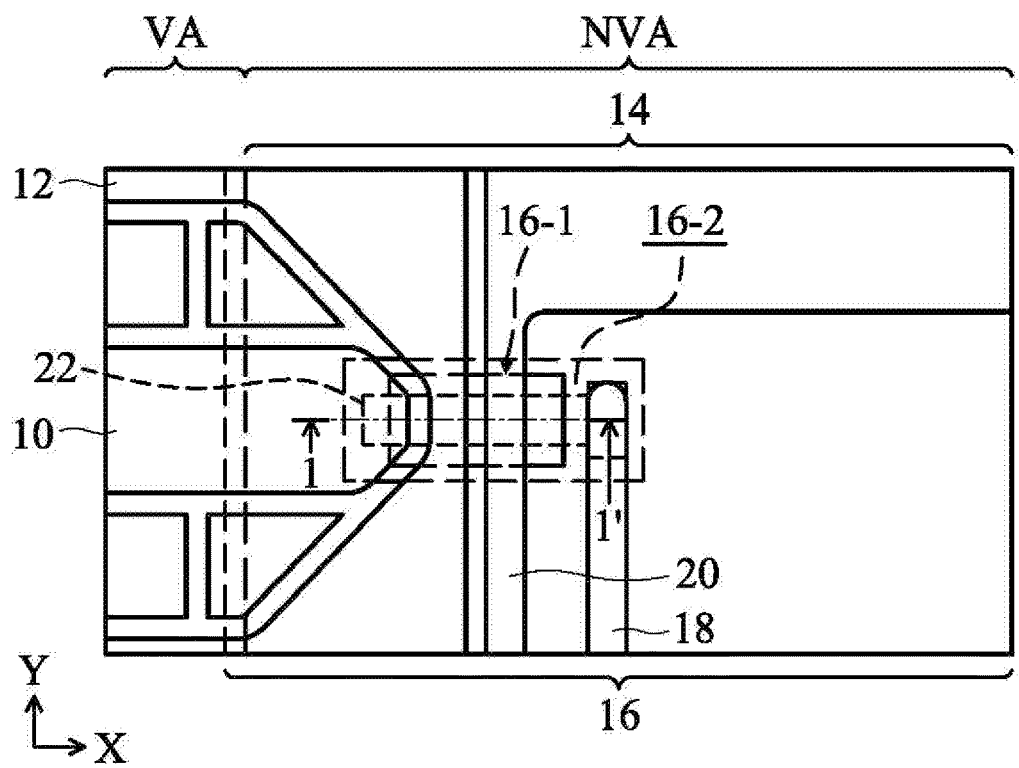
FIG. 1A shows an illustrative plane view of a part of a touch panel with all jumpers disposed in the same direction.

Referring to FIG. 1A, a plane view of a part of a touch panel with all jumpers disposed in the same direction is shown, for example, all of the jumpers in the touch panel are disposed in an X-axial direction. FIG. 1A shows an area at the interface between a non-viewable area NVA and a viewable area VA of the touch panel. An area with a light-shielding layer 14 disposed therein is the non-viewable area NVA. Another area without the light-shielding layer 14 disposed therein is the viewable area VA. The non-viewable area NVA is located in the periphery of the touch panel and surrounds the viewable area VA. A touch sensing signal transmission line 18 and a grounding wire 20 are formed in the non-viewable area NVA. A first axial electrode 10 and a second axial electrode 12 are formed in the viewable area VA. Moreover, a portion of the first axial electrode 10 and the second axial electrode 12 is extended to the non-viewable area NVA.

In the example, the second axial electrode 12 is composed of a plurality of conductive units that are connected with each other. The first axial electrode 10 is composed of a plurality of conductive units that are separated from each other. The conductive units of the first axial electrode 10 are electrically connected to the touch sensing signal transmission line 18 through a jumper 22 at the non-viewable area NVA. In addition, the conductive units of the first axial electrode 10 at the viewable area VA are electrically connected with each other through other jumpers disposed in the same direction as that of the jumper 22. The jumper 22 intersects with the second axial electrode 12 and the grounding wire 20. In order to isolate the jumper 22 from the second axial electrode 12 and the grounding wire 20, an insulating layer 16 is formed between the jumper 22 and the second axial electrode 12 and between the jumper 22 and the grounding wire 20. The insulating layer 16 has an insulating block 16-1 and an opening 16-2. The insulating block 16-1 can isolate the jumper 22 from the second axial electrode 12 and the grounding wire 20. The opening 16-2 can make the conductive units of the first axial electrode 10 to be electrically connected to the touch sensing signal transmission line 18 through the jumper 22.

Figure 1B:
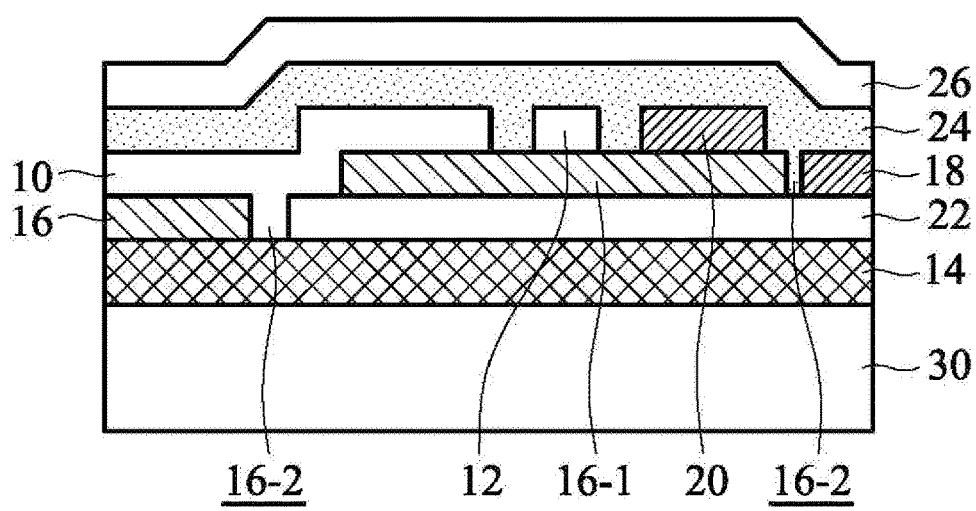
FIG. 1B shows an illustrative cross section of a part of a touch panel along the cross-sectional line 1-1' of FIG. 1A.

FIG. 1B is a cross section of a part of a touch panel along the cross-sectional line 1-1' of FIG. 1A. Firstly, the light-shielding layer 14 is formed on a substrate 30 at the non-viewable area NVA by a first photolithography process. The jumper 22 is then formed on the light-shielding layer 14 by a second photolithography process. Also, other jumpers (not shown) are formed on the substrate 30 at the viewable area VA by the second photolithography process. The other jumpers at the viewable area VA and the jumper 22 at the non-viewable area NVA are disposed in the same direction. The insulating layer 16 is formed over the light-shielding layer 14 by a third photolithography process. The insulating layer 16 has the insulating block 16-1 and the opening 16-2 disposed at the location of the jumper 22 in the non-viewable area NVA. Moreover, the insulating layer 16 has other insulating blocks (not shown) disposed at the location of the jumpers in the viewable area VA. The first axial electrode 10 and the second axial electrode 12 are formed on the substrate 30 at the viewable area VA by a fourth photolithography process. A portion of the first axial electrode 10 and the second axial electrode 12 is extended to the non-viewable area NVA. The touch sensing signal transmission line 18 and the grounding wire 20 are formed by a fifth photolithography process. Next, an optical matching layer 24 is coated on the elements mentioned above. The formation of the optical matching layer 24 does not require a photolithography process. A passivation layer 26 is then formed on the optical matching layer 24 by a sixth photolithography process.

As indicated in the above description, while a touch panel has a grounding wire disposed between the touch sensing signal transmission line and the sensing electrode at the non-viewable area, the touch panel requires a jumper for electrically connecting the touch sensing signal transmission line to the sensing electrode. When all jumpers of a touch panel are disposed in the same direction, six photolithography processes are needed to fabricate the touch panel.

According to some embodiments of the disclosure, touch panels and fabrication methods thereof are provided. Using the orientations of jumpers, the touch panel is completed by five photolithography processes and one photolithography process can be omitted.

Figure 2:
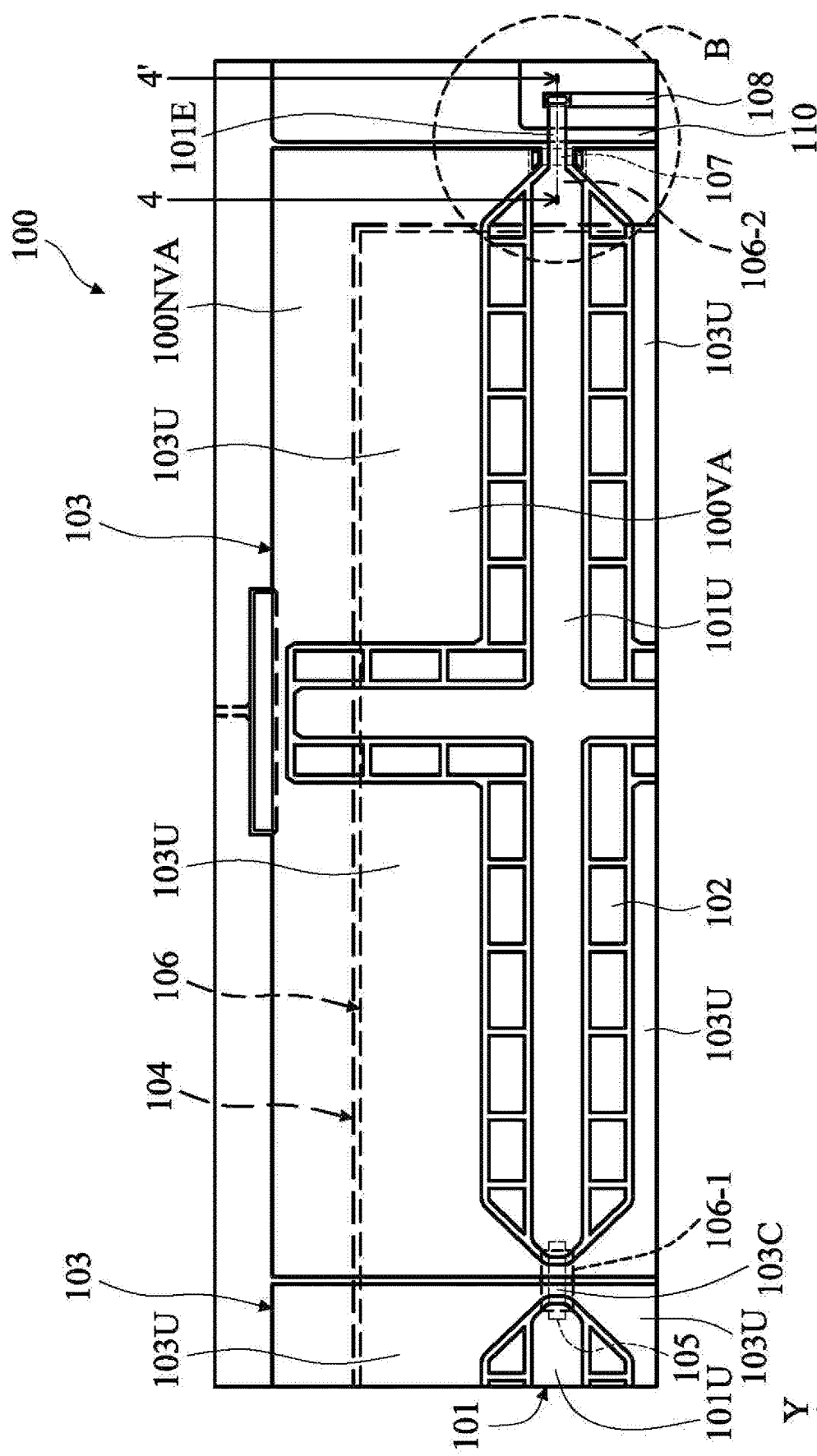
FIG. 2 shows an illustrative plane view of a part of a touch panel according to some embodiments of the disclosure.

Referring to FIG. 2, a plane view of a part of a touch panel 100 according to some embodiments of the disclosure is shown. The touch panel 100 includes a light-shielding layer 104 disposed at a non-viewable area 100NVA. The touch panel 100 also includes a plurality of first axial electrodes 101 and a plurality of second axial electrodes 103 disposed at a viewable area 100VA. Moreover, a portion of the first axial electrodes 101 and a portion of the second axial electrodes 103 are extended to the non-viewable area 100NVA. The first axial electrodes 101 are insulated from and intersect with the second axial electrodes 103. For example, the direction of the first axial electrodes 101 can be, but is not limited to being, perpendicular to the direction of the second axial electrodes 103.

The first axial electrodes 101 are arranged along a first axial direction, for example the direction of an X-axis. Each of the first axial electrodes 101 includes a plurality of first conductive units 101U. At least two adjacent first conductive units 101U are separated from each other. The two adjacent and separated first conductive units 101U are electrically connected with each other through a first jumper 105. In some embodiments, the first conductive unit 101U has an extending part 101E at the non-viewable area 100NVA.

The second axial electrodes 103 are arranged along a second axial direction, for example the direction of a Y-axis. Each of the second axial electrodes 103 includes a plurality of second conductive units 103U. At least two adjacent second conductive units 103U are connected with each other through a connection part 103C at the location of the first jumper 105. The connection part 103C and the second conductive units 103U are integrally formed. In addition, other two adjacent second conductive units 103U at the non-viewable area 100NVA are separated from each other at the location of the extending part 101E of the first conductive unit 101U. The two adjacent and separated second conductive units 103U are electrically connected with each other through a second jumper 107 disposed at the location of the extending part 101E.

According to embodiments of the disclosure, the axial direction (or the orientation) of the first jumper 105 is different from that of the second jumper 107. For example, the axial direction of the first jumper 105 can be perpendicular to the axial direction of the second jumper 107. In some embodiments, the axial direction of the first jumper 105 is, for example, an X-axial direction. The axial direction of the second jumper 107 is, for example, a Y-axial direction. The axial direction of the second jumper 107 is the same as that of the second axial electrodes 103. The axial direction of the first jumper 105 is the same as that of the first axial electrodes 101.

In addition, many dummy patterns 102, not for touch sensing, are disposed between the first conductive units 101U and the second conductive units 103U. The dummy patterns 102 are electrically isolated from the first conductive units 101U and the second conductive units 103U. The dummy patterns 102, the first conductive units 101U and the second conductive units 103U can be formed of the same transparent conductive material. The shapes of the first conductive units 101U and the second conductive units 103U as shown in FIG. 2 are illustrated for an example. Other shapes of the first conductive units 101U and the second conductive units 103U are also suitable for the embodiments of the disclosure.

The touch panel 100 further includes a first wire 108 and a second wire 110 disposed at the non-viewable area 100NVA. The extending part 101E of the first conductive unit 101U is electrically connected to the first wire 108. Moreover, the extending part 101E is insulated from and intersects with the second wire 110. In some embodiments, the first wire 108 is a touch sensing signal transmission line, and the second wire 110 is a grounding wire. The second wire 110 (grounding wire) is located between the first wire 108 (touch sensing signal transmission line) and the second axial electrodes 103.

The touch panel 100 further includes an insulating layer 106 disposed at the intersections of the first axial electrodes 101 and the second axial electrodes 103 to avoid a short-circuit occurring at the intersections of the first axial electrodes 101 and the second axial electrodes 103. The insulating layer 106 includes a first insulating portion 106-1 disposed between the first jumper 105 and the connection part 103C of the second conductive units 103U, and a second insulating portion 106-2 disposed between the second jumper 107 and the extending part 101E of the first conductive unit 101U.

Figure 3:
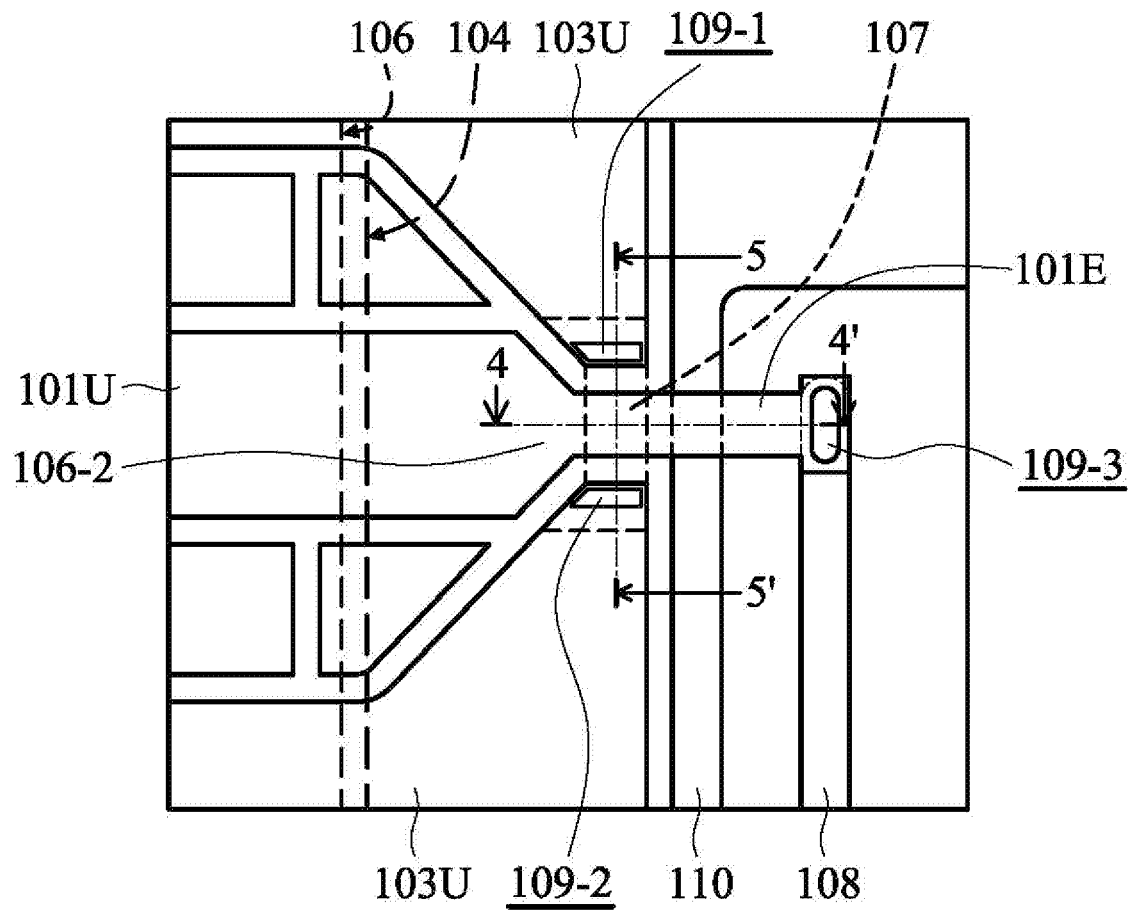
FIG. 3 shows an enlarged plane view of the touch panel in the area B of FIG. 2.

FIG. 3 is an enlarged plane view of a partial area B of the touch panel 100 shown in FIG. 2 according to some embodiments of the disclosure. As shown in FIG. 3, the second insulating portion 106-2 has a first opening 109-1, a second opening 109-2, and a third opening 109-3. The first opening 109-1 and the second opening 109-2 are located in the second jumper 107 to expose a portion of the second jumper 107. The first opening 109-1 and the second opening 109-2 are respectively disposed at two adjacent and separated second conductive units 103U. The two adjacent and separated second conductive units 103U are electrically connected to the second jumper 107 through the first opening 109-1 and the second opening 109-2. Thus, the two adjacent and separated second conductive units 103U are electrically connected with each other. The third opening 109-3 of the second insulating portion 106-2 is located in the first wire 108, such that the extending part 101E of the first conductive unit 101U is electrically connected to the first wire 108 through the third opening 109-3.

Figure 4:
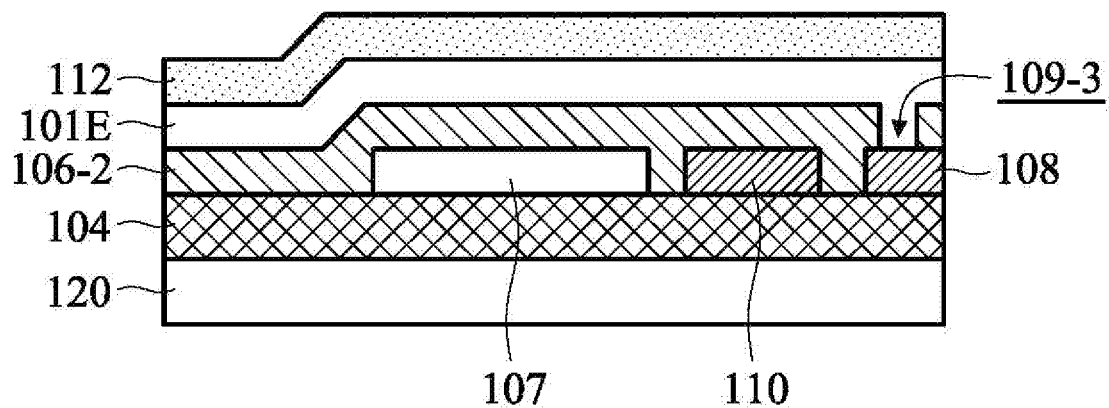
FIG. 4 shows an illustrative cross section of a part of a touch panel along the cross-sectional line 4-4' of FIG. 2 and FIG. 3.

FIG. 4 is a cross section of a part of a touch panel 100, along the cross-sectional line 4-4' of FIG. 2 and FIG. 3, according to some embodiments of the disclosure. The area shown in FIG. 4 is located in the non-viewable area 100NVA of the touch panel 100. As shown in FIG. 4, the light-shielding layer 104 is disposed on a substrate 120. In some embodiments, the substrate 120 is a carrier substrate or a cover lens of the touch panel 100. In other embodiments, the substrate 120 is one substrate of a display panel that is disposed under the touch panel 100.

As shown in FIG. 4, the second jumper 107, the first wire 108 and the second wire 110 are disposed on the light-shielding layer 104. The second insulating portion 106-2 covers the second jumper 107, the first wire 108 and the second wire 110. A portion of the first wire 108 is exposed by the third opening 109-3 of the second insulating portion 106-2. The extending part 101E of the first conductive unit 101U is disposed on the second insulating portion 106-2 and is electrically connected to the first wire 108 through the third opening 109-3. In addition, an optical matching layer 112 is disposed on the extending part 101E of the first conductive unit 101U. Although it is not shown in FIG. 4, the optical matching layer 112 actually covers all elements of the touch panel 100 on the substrate 120. In the embodiments of the disclosure, the first wire 108 and the second wire 110 are covered with the second insulating portion 106-2, and the touch panel 100 does not require an additional passivation layer to protect the first wire 108 and the second wire 110.

Figure 5:
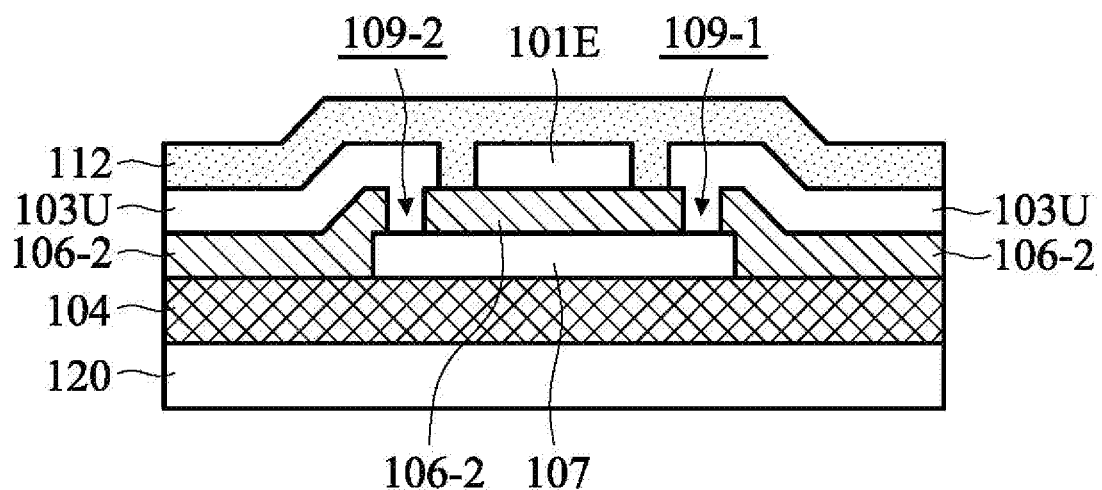
FIG. 5 shows an illustrative cross section of a part of a touch panel along the cross-sectional line 5-5' of FIG. 3.

FIG. 5 is a cross section of a part of a touch panel 100, along the cross-sectional line 5-5' of FIG. 3, according to some embodiments of the disclosure. The area shown in FIG. 5 is located in the non-viewable area 100NVA of the touch panel 100. As shown in FIG. 5, the second insulating portion 106-2 is disposed on the second jumper 107 and the light-shielding layer 104. A portion of the second jumper 107 is exposed by the first opening 109-1 and the second opening 109-2 of the second insulating portion 106-2. The extending part 101E of the first conductive unit 101U and the two adjacent and separated second conductive units 103U are disposed on the second insulating portion 106-2. The two adjacent and separated second conductive units 103U are electrically connected to the second jumper 107 through the first opening 109-1 and the second opening 109-2. Thus, the two adjacent and separated second conductive units 103U are electrically connected with each other. The optical matching layer 112 is disposed on the extending part 101E of the first conductive unit 101U and the second conductive units 103U. Although it is not shown in FIG. 5, the optical matching layer 112 actually covers all elements of the touch panel 100 on the substrate 120.

Figure 6A:
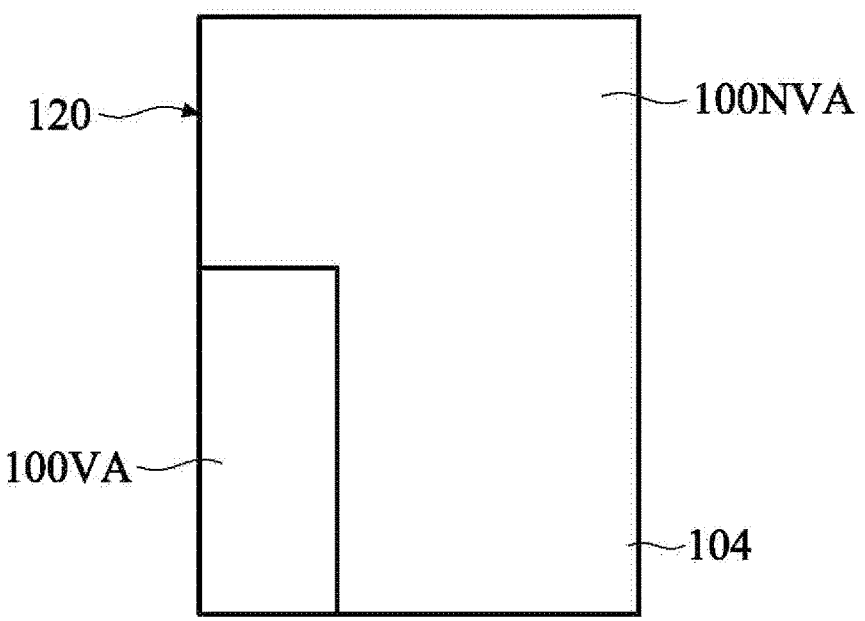
FIGS. 6A-6E show illustrative partial plane views of intermediate stages of forming a touch panel by various photolithography processes according to some embodiments of the disclosure.

FIGS. 6A-6E show partial plane views of intermediate stages of forming the touch panel 100 of FIG. 3 by various photolithography processes according to some embodiments of the disclosure. Referring to FIG. 6A, in a first photolithography process, the light-shielding layer 104 is formed on the substrate 120 at the non-viewable area 100NVA of the touch panel 100.

Figure 6B:
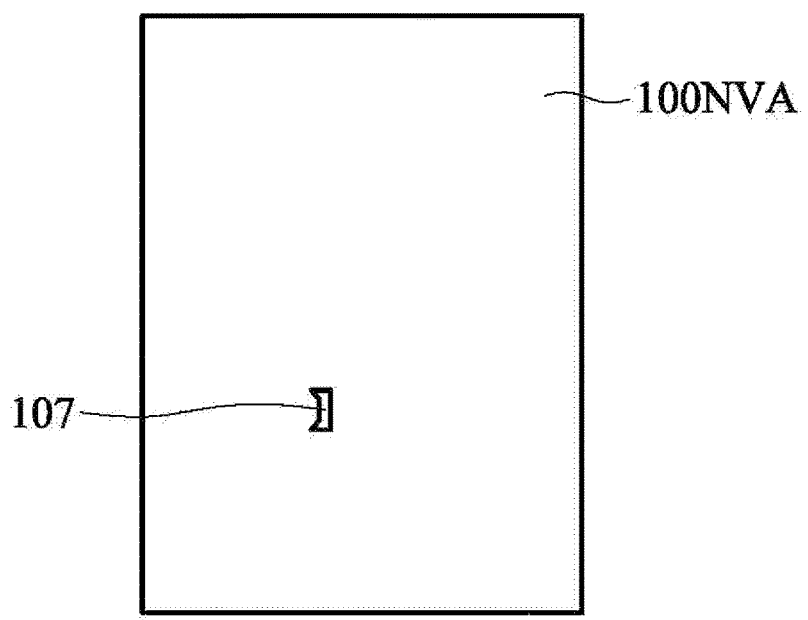

Referring to FIG. 6B, in a second photolithography process, the second jumper 107 is formed on the light-shielding layer 104. Moreover, although the first jumper 105 is not shown in FIG. 6B, the first jumper 105 is actually formed in the second photolithography process together with the second jumper 107. The first jumper 105 and the second jumper 107 can be made of a transparent conductive material or a metal material.

Figure 6C:
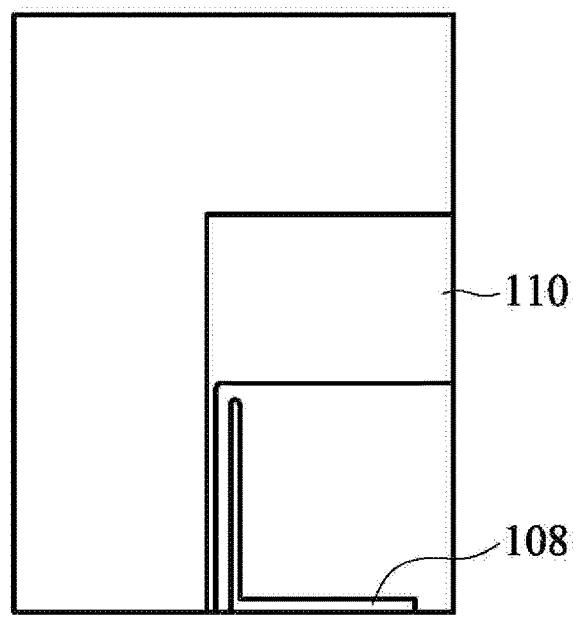

Referring to FIG. 6C, in a third photolithography process, the first wire 108 and the second wire 110 are formed together on the light-shielding layer 104. The first wire 108 and the second wire 110 can be made of a metal material.

Figure 6D:
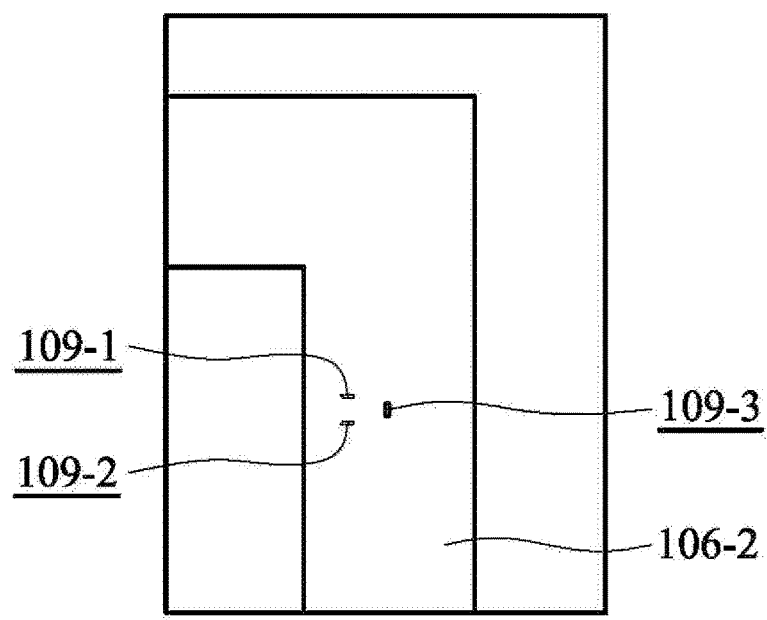

Referring to FIG. 6D, in a fourth photolithography process, the second insulating portion 106-2 of the insulating layer 106 is formed. Although the first insulating portion 106-1 of the insulating layer 106 is not shown in FIG. 6D, the first insulating portion 106-1 is actually formed in the fourth photolithography process together with the second insulating portion 106-2. The material of the insulating layer 106 is, for example, photosensitive polyimide (PI). As shown in FIG. 6D, the second insulating portion 106-2 has the first opening 109-1, the second opening 109-2, and the third opening 109-3. The first opening 109-1 and the second opening 109-2 are located in the second jumper 107. The third opening 109-3 is located in the first wire 108.

Figure 6E:
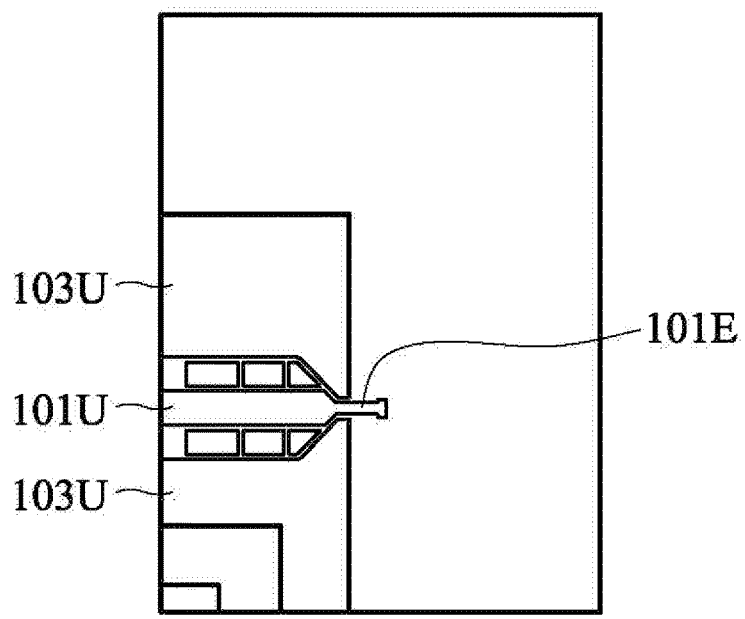

Referring to FIG. 6E, in a fifth photolithography process, the first axial electrodes 101 and the second axial electrodes 103 are formed. One first conductive unit 101U of the first axial electrodes 101 has the extending part 101E. Two adjacent second conductive units 103U of the second axial electrodes 103 are separated from each other at the location of the extending part 101E. The material of the first axial electrodes 101 and the second axial electrodes 103 is a transparent conductive material, for example, indium tin oxide (no), indium zinc oxide (IZO), aluminum zinc oxide (AZO), or the other suitable transparent conductive material. In addition, the material of the first jumper 105 and the second jumper 107 can be the same as that of the first axial electrodes 101 and the second axial electrodes 103. As the above description, the optical matching layer 112 is formed without a photolithography process. Therefore, the touch panels 100 of the disclosure can be completed by five photolithography processes.

Figure 7:
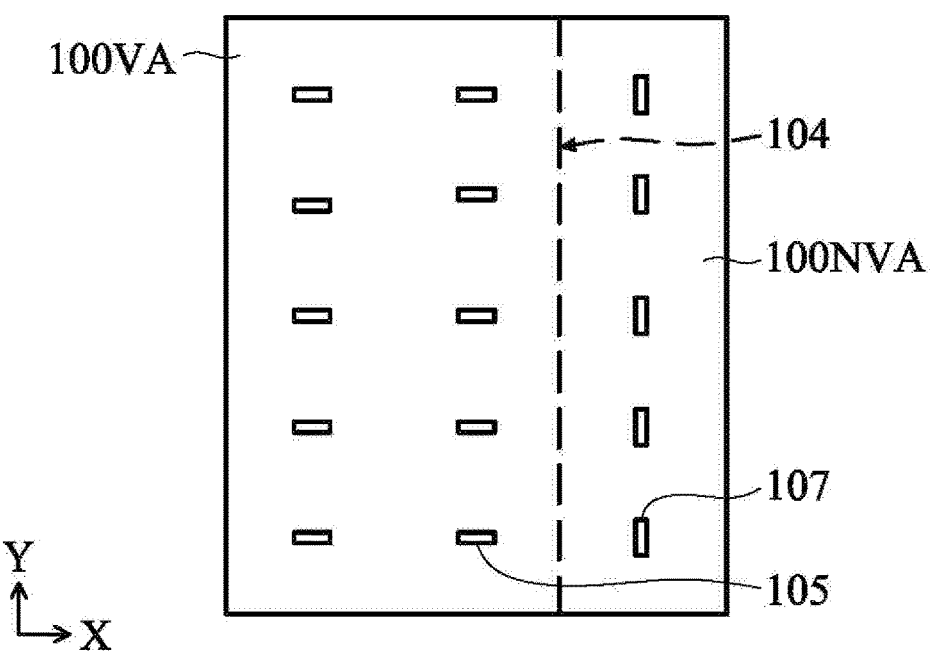
FIGS. 7-9 show illustrative partial plane views of the orientations of jumpers in a touch panel according to some embodiments of the disclosure.

FIG. 7 is a partial plane view of the orientations of the first jumpers 105 and the second jumpers 107 in a touch panel 100 according to some embodiments of the disclosure. As shown in FIG. 7, in some embodiments, the first jumpers 105 with an axial direction, for example, an X-axial direction, are disposed at the viewable area 100VA of the touch panel 100. The first jumpers 105 are used for electrically connecting the adjacent and separated first conductive units 101U with each other. The second jumpers 107 with an axial direction, for example, a Y-axial direction, can be disposed at the non-viewable area 100NVA of the touch panel 100. The second jumpers 107 are used for electrically connecting the adjacent and separated second conductive units 103U with each other. Moreover, in some other embodiments, the second jumpers 107 shown in FIG. 7 can be disposed at the viewable area 100VA of the touch panel 100.

Figure 8:
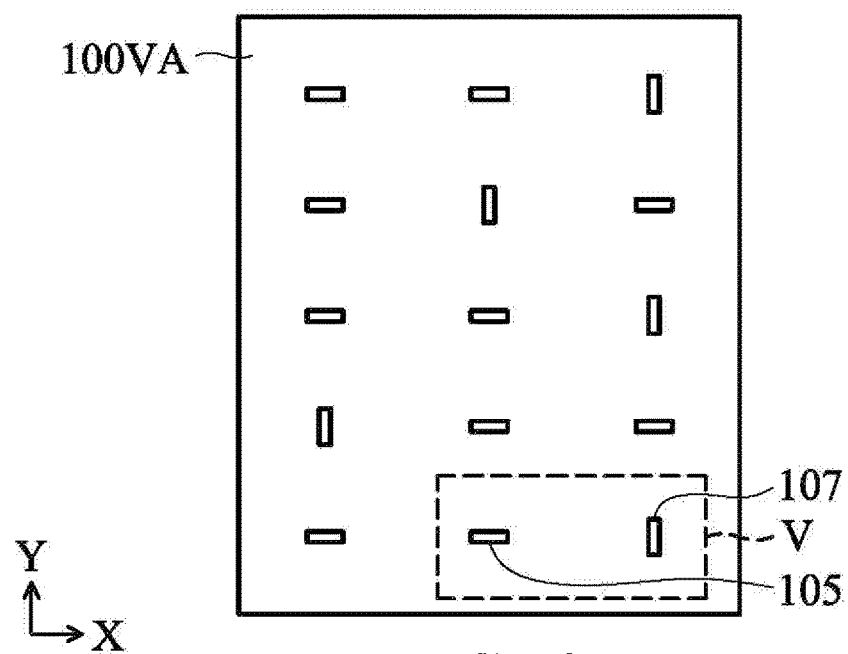

FIG. 8 is a partial plane view of the orientations of the first jumpers 105 and the second jumpers 107 in a touch panel 100 according to some embodiments of the disclosure. As shown in FIG. 8, in some embodiments, the second jumpers 107 with an axial direction, for example, a Y-axial direction can also be disposed at the viewable area 100VA of the touch panel 100. The positions of the second jumpers 107 can be adjusted according to the layout of the two adjacent and separated second conductive units 103U in the viewable area 100VA. The second jumpers 107 are used for electrically connecting the adjacent and separated second conductive units 103U with each other. Therefore, in some embodiments, the positions of the second jumpers 107 in the viewable area 100VA are irregular.

Figure 9:
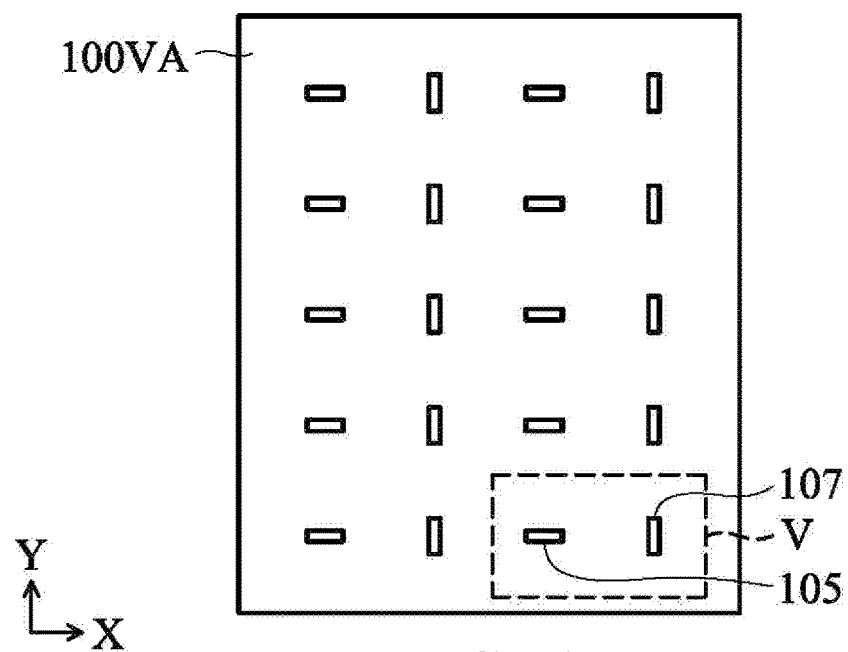

FIG. 9 is a partial plane view of the orientations of the first jumpers 105 and the second jumpers 107 in a touch panel 100 according to some embodiments of the disclosure. As shown in FIG. 9, in some embodiments, the first jumpers 105 with an axial direction, for example, an X-axial direction and the second jumpers 107 with an axial direction, for example, a Y-axial direction are disposed alternately in the viewable area 100VA of the touch panel 100. The first jumpers 105 are used for electrically connecting the adjacent and separated first conductive units 101U with each other. The second jumpers 107 are used for electrically connecting the adjacent and separated second conductive units 103U with each other. Moreover, in some other embodiments, the outer most second jumpers 107 shown in FIG. 9 are disposed at the non-viewable area 100NVA of the touch panel 100.

According to some embodiments of the disclosure, along the Y-axial direction, the jumpers located at the interface between the viewable area 100VA and the non-viewable area 100NVA can be disposed with the orientation of the second jumpers 107. As a result, all the jumpers located at the interface between the viewable area 100VA and the non-viewable area 100NVA are in the viewable area 100VA, or in the non-viewable area 100NVA to prevent the reliability of the jumpers from reducing by the height difference between the light-shielding layer and the substrate of the touch panel.

Figure 10:
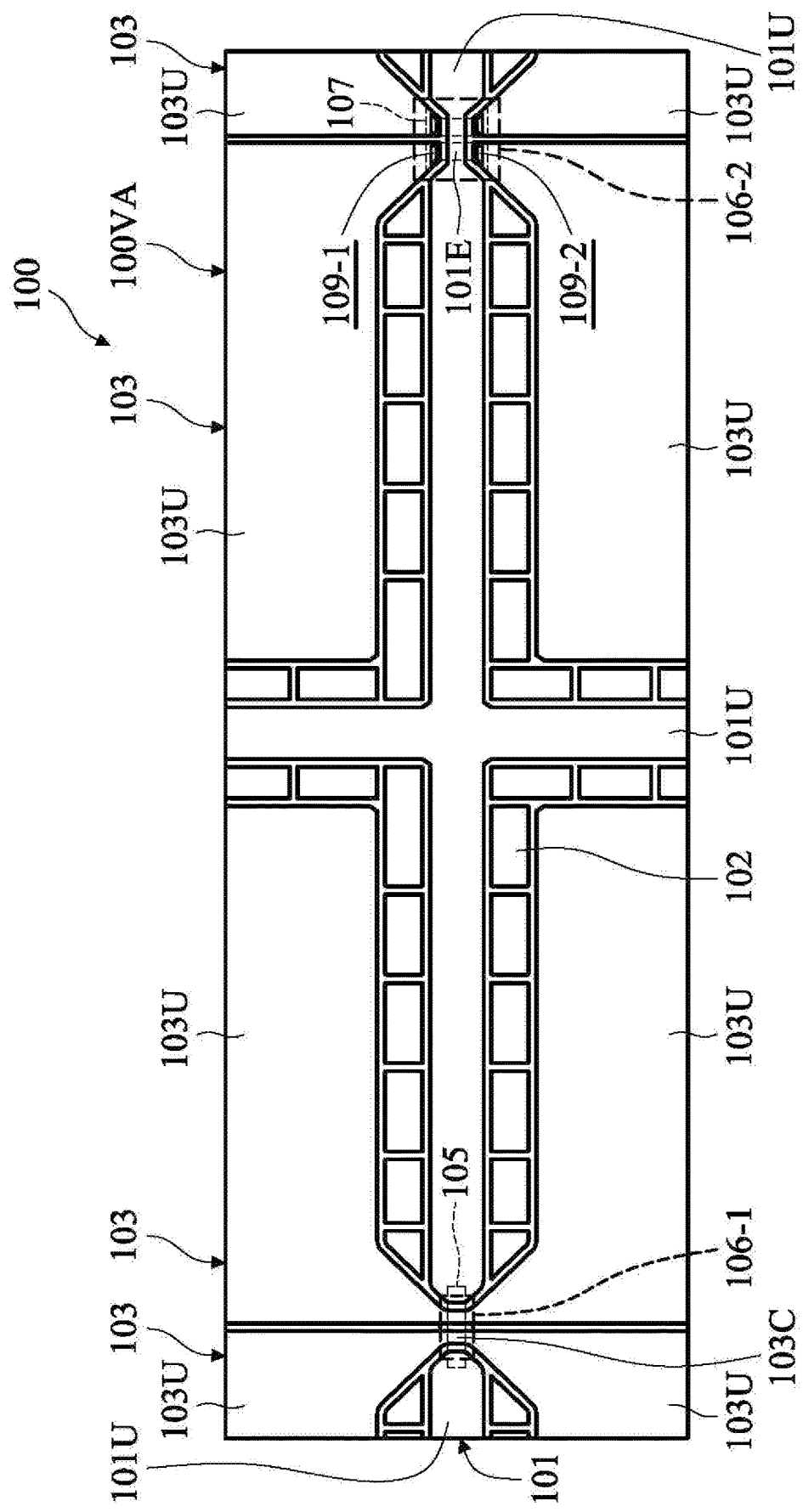
FIG. 10 shows an illustrative partial plane view of a touch panel in the area V of FIG. 8 and FIG. 9 according to some embodiments of the disclosure.

FIG. 10 shows a partial plane view of a touch panel 100 in the area V of FIG. 8 and FIG. 9 according to some embodiments of the disclosure. In the embodiment of FIG. 10, both the first jumper 105 and the second jumper 107 are disposed at the viewable area 100VA. A plurality of axial electrodes 101 are arranged along a first axial direction, for example, an X-axial direction. Each of the first axial electrodes 101 includes a plurality of first conductive units 101U. At least two adjacent first conductive units 101U are separated from each other. The two adjacent and separated first conductive units 101U are electrically connected with each other through the first jumper 105. In the embodiment, at least one first conductive unit 101U has an extending part 101E in the non-viewable area 100NVA. This first conductive unit 101U is connected with another adjacent first conductive unit 101U through the extending part 101E.

As shown in FIG. 10, a plurality of second axial electrodes 103 are arranged along a second axial direction, for example a Y-axial direction. Each of the second axial electrodes 103 includes a plurality of second conductive units 103U. At least two adjacent second conductive units 103U are connected with each other through a connection part 103C at the location of the first jumper 105. Other two adjacent second conductive units 103U are separated from each other at the location of the extending part 101E of the first conductive unit 101U. The second jumper 107 is disposed at the location of the extending part 101E for electrically connecting the adjacent and separated second conductive units 103U with each other. According to the embodiment of the disclosure, the axial direction (or the orientation) of the first jumper 105 is different from that of the second jumper 107. For example, the axial direction of the first jumper 105 can be perpendicular to the axial direction of the second jumper 107. In some embodiments, the axial direction of the first jumper 105 is, for example, an X-axial direction. The axial direction of the second jumper 107 is, for example, a Y-axial direction.

In addition, the touch panel also includes an insulating layer disposed at the intersection of the first axial electrodes 101 and the second axial electrodes 103, such that the first axial electrodes 101 is insulated from the second axial electrodes 103. As shown in FIG. 10, in some embodiments, the insulating layer includes a first insulating portion 106-1 disposed between the first jumper 105 and the connection part 103C of the second conductive units 103U. The insulating layer further includes a second insulating portion 106-2 disposed between the second jumper 107 and the extending part 101E of the first conductive unit 101U. The second insulating portion 106-2 has a first opening 109-1 and a second opening 109-2. The first opening 109-1 and the second opening 109-2 are respectively located at the overlapping areas between two adjacent and separated second conductive units 103U and the second jumper 107. As a result, the two adjacent and separated second conductive units 103U are electrically connected to the second jumper 107 through the first opening 109-1 and the second opening 109-2.

Figure 11:
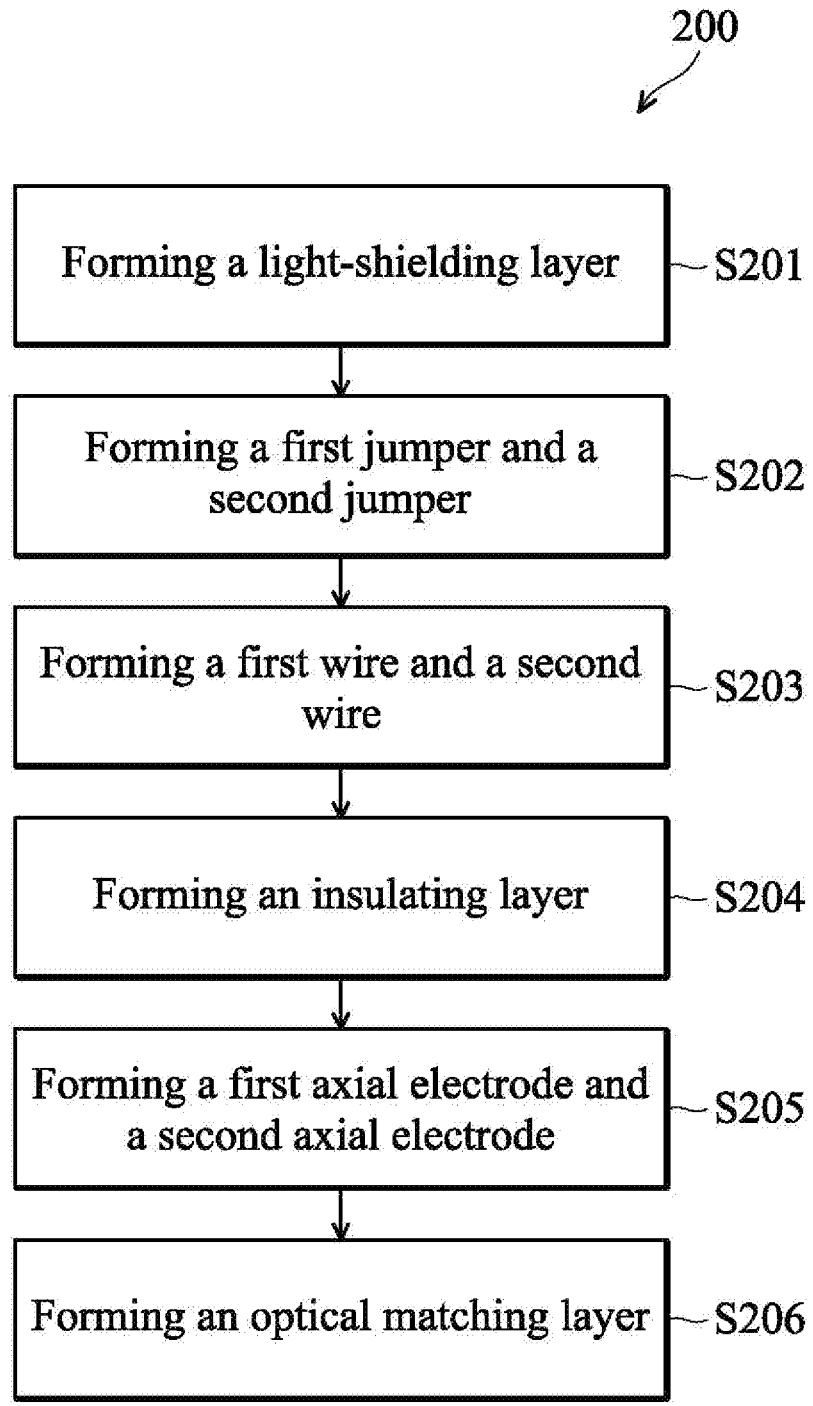
FIG. 11 shows a flow chart of a method of fabricating a touch panel according to some embodiments of the disclosure.

FIG. 11 is a flow chart of a method 200 of fabricating a touch panel 100 according to some embodiments of the disclosure. Referring to FIGS. 2-5 together, in the step 201, the light-shielding layer 104 is formed by using a first photolithography process. The light-shielding layer 104 is formed on the substrate 120 in the non-viewable area 100NVA. The material of the light-shielding layer 104 is, for example, a black photoresist.

In the step 202, the first jumpers 105 and the second jumpers 107 are formed by using a second photolithography process. The first jumpers 105 and the second jumpers 107 are formed on the substrate 120. The material of the first jumpers 105 and the second jumpers 107 is, for example, a transparent conductive material or a metal material. The axial direction (or the orientation) of the first jumpers 105 is different from that of the second jumpers 107. For example, the axial direction of the first jumpers 105 is the X-axial direction, and the axial direction of the second jumpers 107 is the Y-axial direction. In some embodiments, the first jumpers 105 are disposed at the viewable area 100VA, and the second jumpers 107 are disposed at the non-viewable area 100NVA. In some other embodiments, all the first jumpers 105 and the second jumpers 107 are disposed at the viewable area 100VA. Moreover, the positions of the second jumpers 107 in the viewable area 100VA can be irregular or regular. The positions of the second jumpers 107 are depended on the layout of the adjacent and separated second conductive units 103U.

In the step 203, the first wire 108 and the second wire 110 are formed by using a third photolithography process. The first wire 108 and the second wire 110 are formed on the light-shielding layer 104. The material of the first wire 108 and the second wire 110 can be a metal material. In some embodiments, the first wire 108 is a touch sensing signal transmission line, and the second wire 110 is a grounding wire.

In the step 204, the insulating layer 106 is formed by using a fourth photolithography process. The material of the insulating layer 106 is, for example, a photosensitive polyimide (PI). The insulating layer 106 includes the first insulating portion 106-1 located in the first jumper 105 and the second insulating portion 106-2 located in the second jumper 107. Furthermore, the insulating layer 106 covers the first wire 108 and the second wire 110. The first opening 109-1 and the second opening 109-2 are formed in the second insulating portion 106-2 to expose a portion of the second jumper 107. Moreover, the third opening 109-3 is also formed in the second insulating portion 106-2 to expose a portion of the first jumper 105.

In the step 205, the first axial electrodes 101 and the second axial electrodes 103 are formed by using a fifth photolithography process. The first axial electrodes 101 and the second axial electrodes 103 are formed on the substrate 120 in the viewable area 100VA. Moreover, a portion of the first axial electrodes 101 and a portion of the second axial electrodes 103 are extended to the non-viewable area 100NVA. The details of the structure of the first axial electrodes 101 and the second axial electrodes 103 are mentioned as the above description. The adjacent and separated first conductive units 101U of the first axial electrode 101 are electrically connected with each other through the first jumper 105. The adjacent and separated second conductive units 103U of the second axial electrode 103 are electrically connected with each other through the second jumper 107. In some embodiments, the extending part 101E of the first conductive unit 101U at the non-viewable area 100NVA is electrically connected to the first wire 108 through the third opening 109-3 of the second insulating portion 106-2. In some other embodiments, the extending part 101E of the first conductive unit 101U at the viewable area 100VA is directly connected with another adjacent first conductive unit 101U.

In the step 206, the optical matching layer 112 is formed to cover all elements of the touch panel 100. The formation of the optical matching layer 112 does not require a photolithography process.

According to the embodiments of the disclosure, the first wire and the second wire of the touch panel are covered with the insulating layer. There is no need for forming a passivation layer over the optical matching layer. The touch panels of the disclosure can be completed by five steps of photolithography process. Compared with the touch panel shown in FIG. 1A and FIG. 1B, a six-step photolithography process is needed to complete the fabrication of the touch panel. The touch panels of the disclosure can save one step of photolithography process for forming the passivation layer. The fabrication cost of the touch panels according to the disclosure is thereby reduced. Meanwhile, according to the embodiments of the disclosure, the touch panel can omit a passivation layer. Therefore, the overall thickness of the touch panels is reduced.

While the disclosure has been described by way of example and in terms of certain embodiments, it is to be understood that the disclosure is not limited to the disclosed embodiments. The disclosure is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of fabricating a touch panel, comprising:

forming a first jumper and a second jumper over a substrate, wherein an axial direction of the second jumper is different from the axial direction of the first jumper, wherein the substrate comprises a viewable area and a non-viewable area, and the second jumper is disposed within the non-viewable area;

forming an insulating layer including a first insulating portion located in the first jumper and a second insulating portion located in the second jumper, wherein the second insulating portion has a first opening and a second opening to expose a portion of the second jumper, wherein the second insulating portion is disposed within the non-viewable area; and forming a first axial electrode and a second axial electrode on the substrate, wherein the first axial electrode includes a plurality of first conductive units, two adjacent first conductive units are separated from each other and electrically connected with each other through the first jumper, one of the plurality of first conductive units has an extending part extending to the non-viewable area; the second axial electrode includes a plurality of second conductive units, two adjacent second conductive units are connected with each other through a connection part at the location of the first jumper, other two adjacent second conductive units are separated from each other at the location of the extending part of the first conductive unit, the two adjacent and separated second conductive units are electrically connected to the second jumper through the first opening and the second opening, and the second axial electrode is insulated from and intersects with the first axial electrode.

2. The method of claim 1, further comprising:

forming a light-shielding layer on the substrate and at the non-viewable area of the touch panel; and forming a first wire and a second wire on the light-shielding layer, wherein the second insulating portion covers the first wire and the second wire, and the second insulating portion has a third opening located in the first wire, such that the extending part of the first conductive unit is electrically connected to the first wire through the third opening, and the extending part of the first conductive unit is insulated from and intersects with the second wire.

3. The method of claim 2, wherein the step of forming the insulating layer is performed after the step of forming the first jumper and the second jumper and the step of forming the first wire and the second wire.

4. The method of claim 2, wherein the first jumper and the second jumper are formed at the same time by a photolithography process, the first jumper is formed on the substrate in the viewable area of the touch panel, and the second jumper is formed on the light-shielding layer in the non-viewable area of the touch panel.

5. The method of claim 2, wherein the first axial electrode and the second axial electrode are formed at the same time by a photolithography process, and the step of forming the first axial electrode and the second axial electrode is performed after the step of forming the first wire and the second wire and the step of forming the insulating layer.

6. The method of claim 1, wherein extending part of the first conductive unit connects with another adjacent first conductive unit.

* * * * *

UNITED STATES PATENT AND TRADEMARK OFFICE
CERTIFICATE OF CORRECTION

PATENT NO. : 10,983,629 B2  
APPLICATION NO. : 16/438494  
DATED : April 20, 2021  
INVENTOR(S) : Yanjun Xie et al.

Page 1 of 1

It is certified that error appears in the above-identified patent and that said Letters Patent is hereby corrected as shown below:

On the Title Page (*) Notice should read, There is no Terminal Disclaimer for the patent.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*